US009937903B2

(12) United States Patent
Van Den Bos (10) Patent No.: US 9,937,903 B2
(45) Date of Patent: Apr. 10, 2018

(54) JACK ASSEMBLY

(71) Applicant: Bos Fabrication Engineering Services Pty Ltd, St Marys (AU)

(72) Inventor: Jurgen Van Den Bos, Sydney (AU)

(73) Assignee: BOS FABRICATION ENGINEERING SERVICES PTY LTD (AU)

( * ) Notice: Subject to any disclaimer, the term of this patent is extended or adjusted under 35 U.S.C. 154(b) by 92 days.

(21) Appl. No.: 14/768,332

(22) PCT Filed: Feb. 19, 2014

(86) PCT No.: PCT/AU2014/000143
§ 371 (c)(1),
(2) Date: Aug. 17, 2015

(87) PCT Pub. No.: WO2014/127411
PCT Pub. Date: Aug. 28, 2014

(65) Prior Publication Data
US 2015/0360653 A1    Dec. 17, 2015

(30) Foreign Application Priority Data

Feb. 19, 2013  (AU) ................. 2013200923

(51) Int. Cl.
*B60S 9/02* (2006.01)
*B60S 9/18* (2006.01)
(Continued)

(52) U.S. Cl.
CPC ............... *B60S 9/18* (2013.01); *B60D 1/665* (2013.01); *B60S 9/08* (2013.01); *B62D 63/08* (2013.01);
(Continued)

(58) Field of Classification Search
CPC ........................................................ B60S 9/16
(Continued)

(56) References Cited

U.S. PATENT DOCUMENTS 2,828,971 A * 4/1958 Stinson .................... B60D 1/66
254/419
3,921,958 A * 11/1975 Brockelsby ............... B60S 9/16
254/420
(Continued)

FOREIGN PATENT DOCUMENTS

| CA | 2531272 A1 | 6/2006 |
|---|---|---|
| GB | 924592 | 4/1964 |
| WO | 2011015467 A1 | 2/2011 |

OTHER PUBLICATIONS

Written Opinion of the International Searching Authority corresponding to PCT/AU2014/000143, dated May 14, 2014, six pages.
(Continued)

*Primary Examiner* — Tony H Winner
(74) *Attorney, Agent, or Firm* — Kilpatrick Townsend & Stockton LLP (57) ABSTRACT

A jack assembly including a telescopic column driven via a gear box, wherein: the gear box is coupled to a rotary input of a drive mechanism that extends and retracts the column; the gear box has only a single input gear and a single output gear that is coupled to the drive mechanism; and the input gear has a connector adapted to be engaged and driven by a portable, hand-held power tool. A jack assembly with a gear box for use as a jockey wheel for attachment to a towed vehicle, to raise and lower a draw bar of the vehicle is also provided.

17 Claims, 12 Drawing Sheets

(51) Int. Cl.
  *F16M 11/22* (2006.01)
  *F16M 11/24* (2006.01)
  *B60S 9/08* (2006.01)
  *B66F 3/16* (2006.01)
  *B60D 1/66* (2006.01)
  *B62D 63/08* (2006.01)
  *F16H 1/06* (2006.01)

(52) U.S. Cl.
  CPC .............. *B66F 3/16* (2013.01); *F16H 1/06* (2013.01); *F16M 11/22* (2013.01); *F16M 11/24* (2013.01); *Y10T 74/19688* (2015.01)

(58) Field of Classification Search
  USPC .................. 180/13; 280/767, 475, 763.1
  See application file for complete search history.

(56) References Cited

U.S. PATENT DOCUMENTS

| | | | | |
|---|---|---|---|---|
| 5,542,647 | A * | 8/1996 | Huetsch | B60S 9/08 254/103 |
| 6,010,154 | A | 1/2000 | Payne et al. | |
| 6,446,937 | B1 * | 9/2002 | Straw, Sr. | B60S 9/08 248/352 |
| 6,779,616 | B1 * | 8/2004 | Brown | B60D 1/246 180/13 |
| 7,451,841 | B2 * | 11/2008 | Nelson | B62D 51/04 180/13 |
| 7,588,109 | B2 * | 9/2009 | Wachendorf | B62M 6/75 180/202 |
| 7,621,356 | B2 * | 11/2009 | Quarberg | B60D 1/246 180/11 |
| 8,910,924 | B2 * | 12/2014 | Alanko | B60S 9/08 254/418 |
| 2003/0209896 | A1 | 11/2003 | Daniel | |
| 2016/0229244 | A1 * | 8/2016 | Drake | B60D 1/66 |

OTHER PUBLICATIONS

Search Report and Written Opinion corresponding to PCT/AU2014/000143, dated May 14, 2014, five pages.
Written Opinion of the International Preliminary Examining Authority corresponding to PCT/AU2014/000143, dated Aug. 20, 2014, ten pages.
Written Opinion of the International Preliminary Examining Authority corresponding to PCT/AU2014/000143, dated Nov. 21, 2014, eight pages.
Written Opinion of the International Preliminary Examining Authority corresponding to PCT/AU2014/000143, dated Feb. 17, 2015, eight pages.
International Preliminary Report on Patentability corresponding to PCT/AU2014/000143, dated Jun. 15, 2015, nine pages.

* cited by examiner

JACK ASSEMBLY

FIELD OF THE INVENTION

The present invention relates to a jack assembly particularly but not exclusively for a jockey wheel.

BACKGROUND OF THE INVENTION

A jockey wheel for a towed vehicle such as a caravan may include a telescopic jack clamped to a drawbar of the caravan and a wheel connected to a lower end of the jack. A permanently fixed hand crank is used to raise and lower the wheel to assist in connecting or releasing the drawbar from a towing vehicle.

The physical force needed to wind the jack up and down is beyond the capabilities of many people, particularly elderly people.

A hydraulic jack for lifting or supporting a vehicle is also available. The hydraulic jack is height adjustable by pumping a lever up and down. However, the hydraulic jack can also be physically challenging to operate and, once pressure is removed from the jack, there is no easy way to collapse the jack down for storage.

OBJECT OF THE INVENTION

The present invention seeks to provide a jack assembly that is easier to use.

SUMMARY OF THE INVENTION

In accordance with the invention there is provided a jack assembly including a telescopic column driven via a gear box, wherein:

the gear box is coupled to a rotary input of a drive mechanism that extends and retracts the column;

the gear box has only a single input gear and a single output gear that is coupled to the drive mechanism; and the input gear has a connector adapted to be engaged and driven by a portable, hand-held power tool.

Preferably, the gears are driven to rotate about axes transverse to the column and the drive mechanism includes a gear module with a block that houses bevel gears that transfer the drive from the gearbox into longitudinal extension of retraction of the column.

Preferably, the module includes first and second bevel gears in predefined positions so that teeth of the first bevel gear mesh with the teeth of the second bevel gear.

Preferably, the gear box fits on to a rotary input associated with the first bevel gear of the module.

Preferably, the drive mechanism further includes a threaded rod that connects into the module, through a base of the block, to engage with the second bevel gear.

Preferably, the gear ratio of the gear box is at least 2:1.

Preferably, the gear ratio is in the order of 2.5:1.

Preferably, the lifting capacity of the jack assembly is in the order of at least 600 kg.

Preferably, the input work/power ratio of the power tool is 18V/45 NM.

Preferably, the jack assembly further includes a pivot coupling to connect to a swing bracket and a locking plate with apertures that align with locking pins associated with the bracket, to lock the jack assembly relative to the bracket.

In another aspect, there is provided a swing leg including a lifting leg formed of the jack assembly, as described above, a bracket for connecting to a vehicle chassis, a pivot coupling to connect the lifting leg to the bracket and a handle with locking pins to locate in the locking plate.

In another aspect, there is provided a gear module for use in the jack assembly, as described above, including a block that houses first and second bevel gears in predefined positions so that teeth of the first bevel gear mesh with the teeth of the second bevel gear.

Preferably, the block includes an opening in a first side for connection of a rotary input member with the first bevel gear and an opening in a base for connection of a head of a threaded rod into the second bevel gear.

Preferably, the first bevel gear is fixed in position by a bearing that is fitted onto a collar of the first bevel gear and secured in the opening by a retainer clip.

Preferably, the module further includes a passage in the block that aligns with an aperture in the second bevel gear and a through bore in the head of the threaded rod, to allow a clip to be inserted to couple the threaded rod to the second bevel gear.

In another aspect, there is provided a jockey wheel including a telescopic column for attachment to a towed vehicle, to raise and lower a draw bar of the vehicle, wherein the column includes:

a drive mechanism with a rotary input that rotates to cause the column to extend or retract; and a gear box with a rotary connector adapted to connect to and be driven by a power tool, wherein the gear box drives the input so as to provide for geared operation of the drive mechanism.

Preferably, the rotary input is located at one end of the column and the gear box includes a housing that sits over the end of the column such that the rotary input connects with an output gear of the gear box.

Preferably, the jockey wheel fitted with the gear box is portable and demountable from the draw bar.

Preferably, the gear box further includes an input gear coupled to the rotary connector.

Preferably, the rotary input has a square thread for receipt in a corresponding socket of the output gear and the input gear includes a square shaped socket for receipt of a bit of the power tool.

Preferably, the rotary input includes a pin to lock the output gear onto the input.

Preferably, the jockey wheel further includes a coupling at a lower end of the column for connection with a mount of a wheel.

Preferably, the coupling includes a release pin to rotatably hold the mount to the column.

Preferably, the column has a series of ribs at spaced locations along the extent of the column, to engage in a clamp for securing the jockey wheel to the draw bar of the vehicle.

Preferably, the column has at least three ribs.

In another aspect, there is provided a kit of parts, including a jockey wheel, as described above, and a bit for a power tool to couple with the rotary input.

Preferably, the kit of parts further includes a stabilising plate fitted with a mount which can be connected in place of a wheel of the jockey wheel.

Preferably, the kit further includes a handle for manual operation of the drive mechanism.

Preferably, the handle is adapted to connect to the rotary connector of the gear box.

Preferably, the kit further includes an adapter to connect the bit to a rotary drive of another device, such as a stabilizing leg device, of a vehicle.

Preferably, the kit further includes a power tool and battery pack.

In another aspect, there is provided a vehicle to be towed including a jack assembly, as described above, and/or a jockey wheel fitted to a drawbar of the vehicle.

BRIEF DESCRIPTION OF THE DRAWINGS

The invention is described, by way of example only, with reference to the accompanying drawings, in which.

DETAILED DESCRIPTION OF THE INVENTION

Figure 1A:
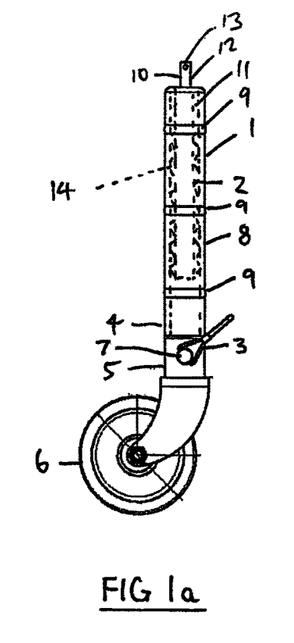
FIG. 1a is side view of a jockey wheel including a jack assembly.
Figure 1B:
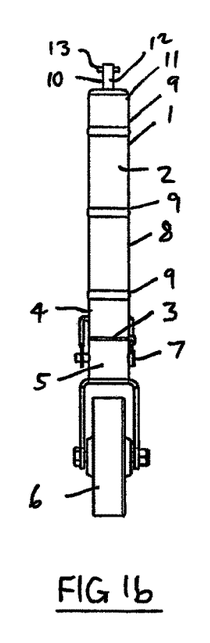
FIG. 1b is a front view of the jockey wheel.
Figure 1C:
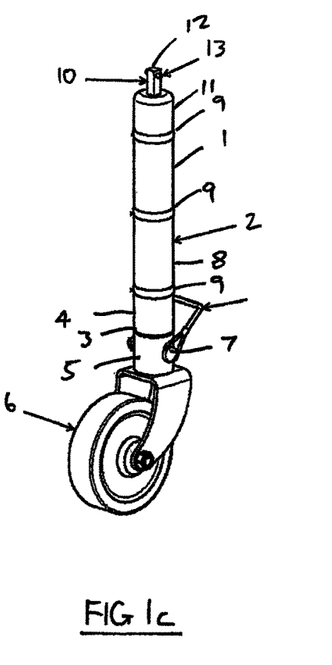
FIG. 1c is a perspective view of the jockey wheel.

Referring firstly to FIG. 1, a jockey wheel 1 is shown as including a jack assembly 2 that has a coupling 3 at a lower end 4 that connects with a mount 5 of a wheel 6. The mount 5 is held in place by a release pin 7.

The jack assembly 2 includes a telescopic column 8 with a series of external ribs 9, arranged lengthwise of the column 8. A rotary input 10 is available at an upper end 11 of the assembly 2. The input 10 has a square shaped thread 12 and a locking pin 13.

Rotation of the input 10 activates an internal drive mechanism 14 that causes the column to extend or retract in response to movement of the input. The mechanics of the drive mechanism, for converting rotary movement into linear movement would be readily apparent to a person skilled in the art.

Figure 2:
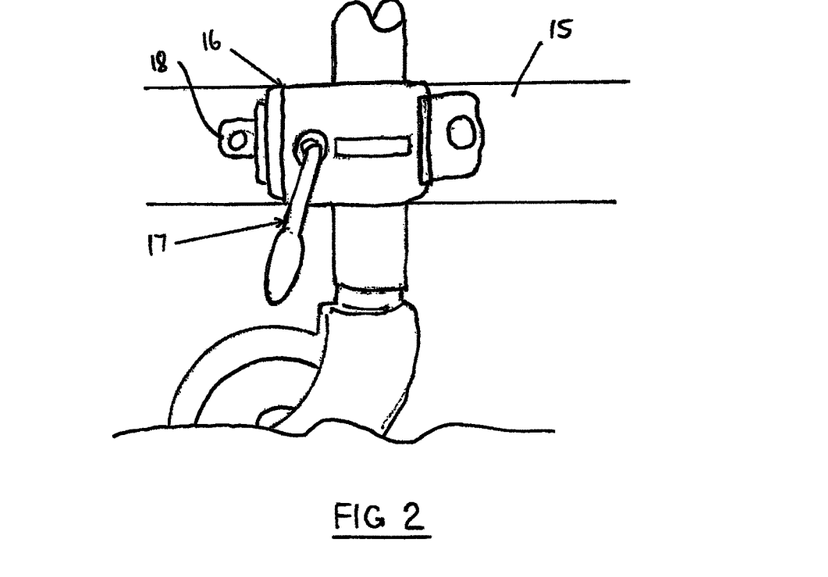
FIG. 2 illustrates a clamp for holding the jockey wheel.

With regard to FIG. 2, the jockey wheel 1 can be mounted to a drawbar 15 of a towed vehicle such as a caravan (not shown) by way of a clamp 16. The clamp 16 includes a quick release lever 17 and custom designed security nut 18 to restrict unauthorized tampering or removal of the jack assembly 2.

As can be seen, the jockey wheel 1 has been clamped at the lowermost rib 9 so the jockey wheel 1 is raised high for transport. Most commercially available jockey wheels only have two ribs that restrict the height the jockey wheel can connect to the drawbar and, as a result, a traditional jockey wheel generally needs to be removed for transit in order to provide sufficient clearance with a road surface or the like.

Figure 3:
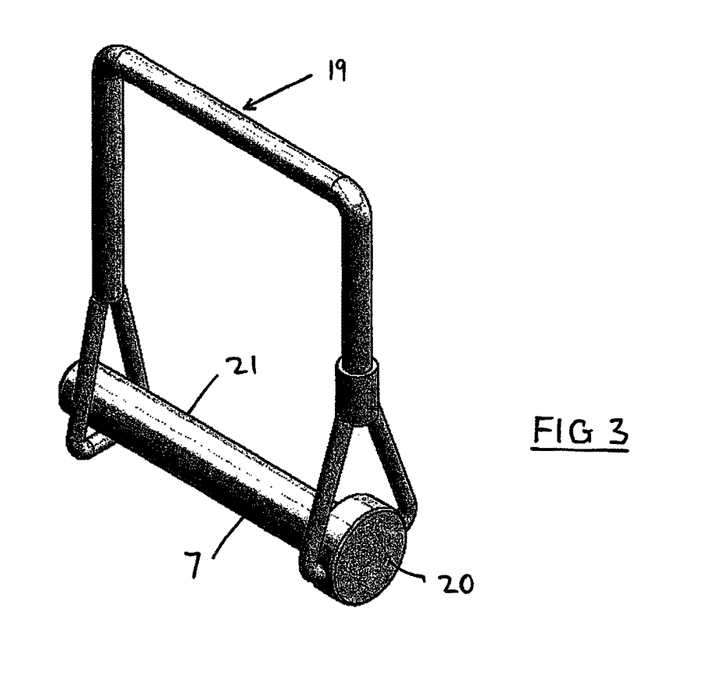
FIG. 3 is a perspective view of a release pin.

In any case, if required, the wheel 6 can be removed from the jack assembly 2, by firstly removing the release pin 7. The pin 7 is shown in more detail in FIG. 3. A resilient brace 19 loops from a head 20 of the pin 7 around a shank 21. To release the pin 7, the brace 19 is slipped off the shank 21 and the pin 7 is then pulled free of the coupling 3.

Figure 4:
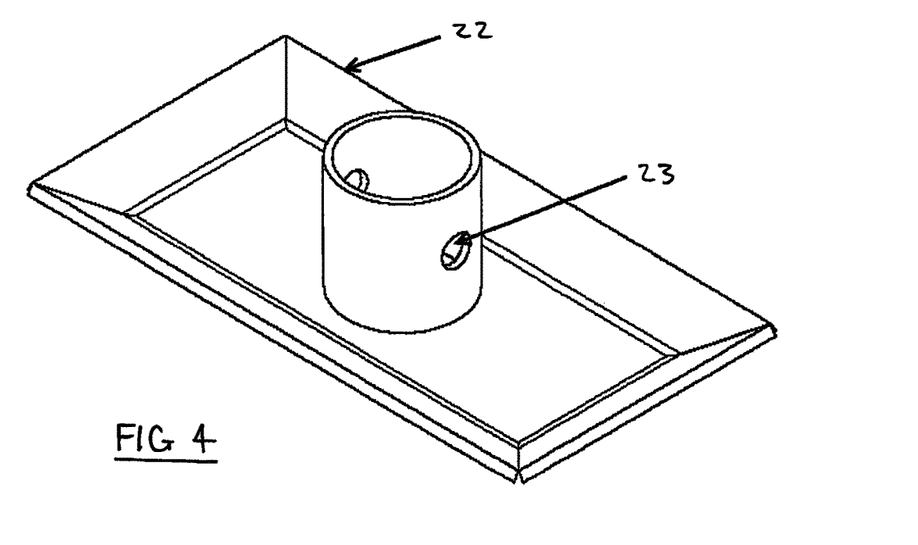
FIG. 4 is a base plate for use with the jack assembly.

Once the wheel 6 has been removed, a replacement support plate 22, as shown in FIG. 4, can instead be fitted to the jack assembly 2. The plate 22 has a collar 23 arranged to slide over the coupling 3 and be anchored in place using the release pin 7. The plate 22 has greater support capacity compared to the wheel 6 and is suitable for carrying the weight load of the vehicle/caravan on either hard or soft support surfaces.

The jack assembly 2 can be actuated by direct drive applied to the rotary input 10, such as by a suitable power drill or the like. However, power requirements may be excessive for direct drive of the rotary input 10.

Figure 5:
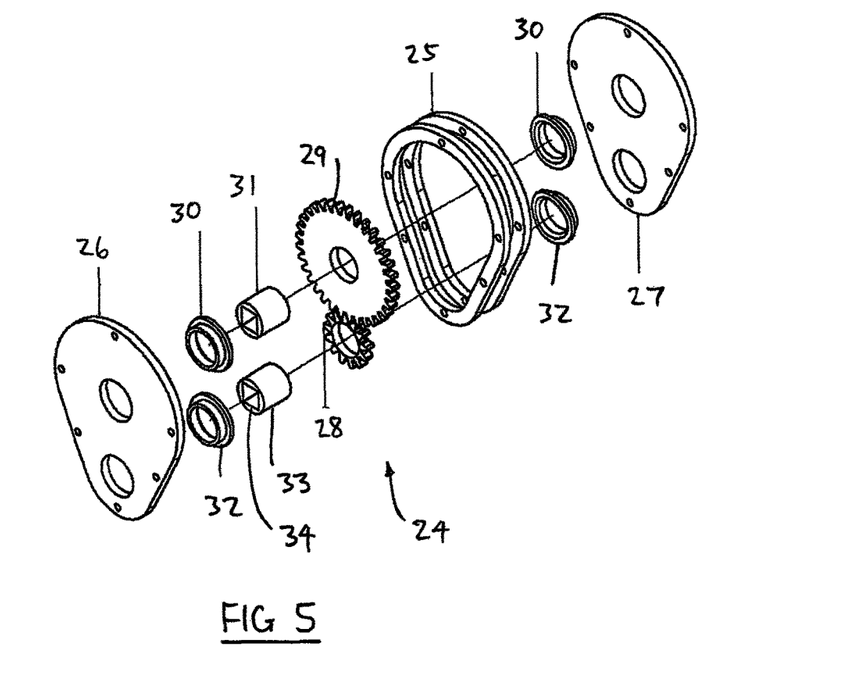
FIG. 5 is a perspective view of a gear box.

Instead of being driven directly by the power tool, the rotary input 10 may instead be driven by an intermediate gear box 24, as shown in FIG. 5.

The gear box 24 has a casing 25 with a top and bottom plate 26, 27. A small input gear 28 is provided to connect with a power tool and that drives a larger output gear 29 arranged to couple directly to the rotary input 10.

The output gear 29 is mounted on two bushes 30 and has an associated socket 31 to receive and connect with the rotary input 10 projecting from the column 8.

The input gear 28 also has two bushes 32 and an associated connector 33, in the form of a square shaped socket 34, keyed to the input gear 28.

In relation to the gear box 24, the input and output gears 28, 29 are designed but not limited to operation on a x:y ratio ensuring the square thread 12 is not stripped by rapid revolutions of the power tool used to drive the rotary input 10. The casing 25 is fully enclosed and requires no maintenance. The gears 28, 29 may be manufactured from any material including but not limited to nylon. The casing 25 may also be manufactured from any material although stainless steel is preferred.

Figure 6:
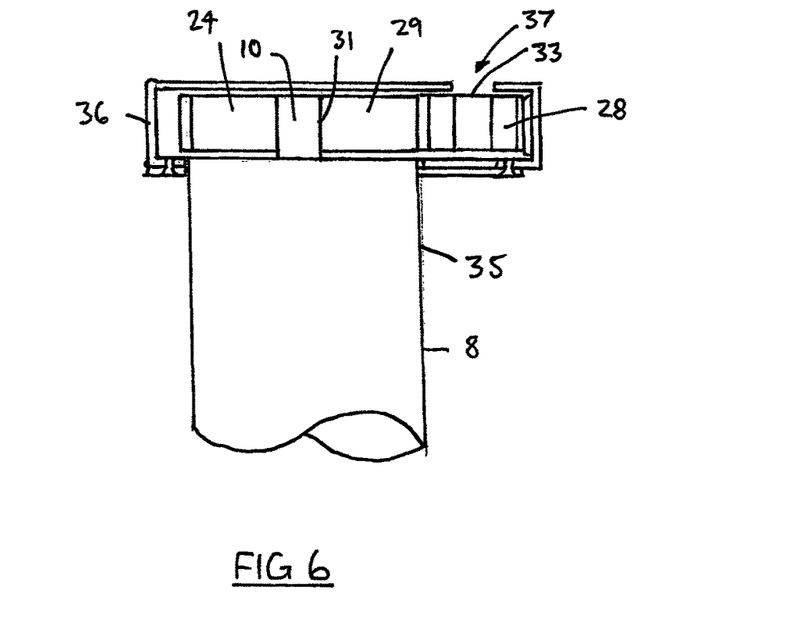
FIG. 6 is a partial sectioned view of the jack assembly with the gear box fitted.
Figure 7:
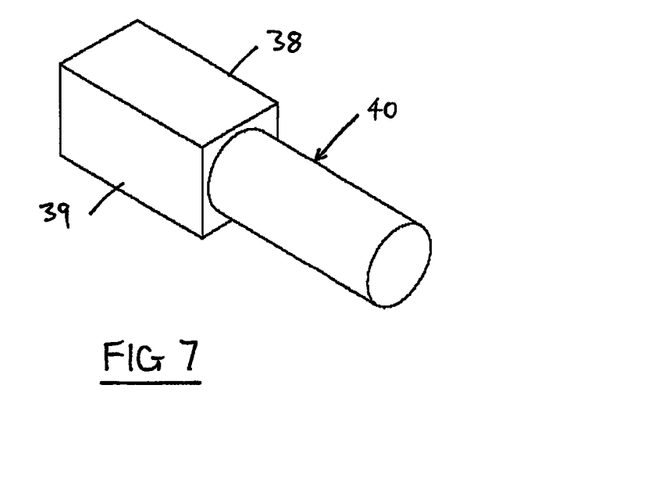
FIG. 7 is an isometric view of a bit for a power tool.

With reference now to FIG. 6, the gear box 24 is mounted over a top end 35 of the column 8 so that the socket 31 of the output gear 29 fits over and engages the rotary input 10 of the drive mechanism 14. The gear box 24 is fitted into a housing 36 that is connected by fasteners to a flange projecting from the column. An opening 37 is provided in the housing 36 to allow access to the connector 33 by a corresponding shaped driving bit 38, as shown in FIG. 7.

The bit 38 has a square shaped head 39 and a tail 40 that fits in a chuck of a power tool. The bit 38 and connector 33 may have an opposite construction where the connector 33 has a square thread and the bit 38 is shaped like a square nut. As a further alternative, the bit and connector may have different profiles such as, for example, matching hexagonal profiles or the like.

In either case, the bit 38 is designed to fit with the connector 33 through the opening 37 to provide geared driving force to rotary input 10. By engaging the smaller gear 28, the bit 38 is able to extend and retract the column 8, with less torque than would be required with direct drive of the input 10.

Figure 8:
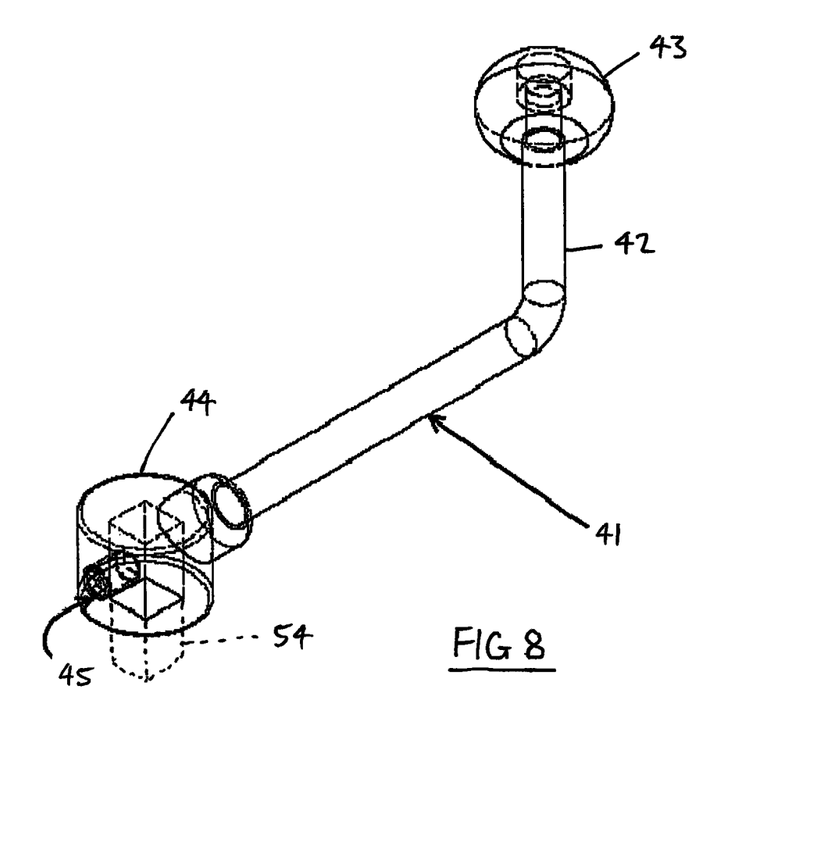
FIG. 8 is a perspective view of a handle for manual operation of the jack assembly.

Since the torque requirements are reduced, the drive mechanism 14 can also be readily operated manually. For that purpose, a handle 41, as shown in FIG. 8, is provided.

The handle 41 has a lever arm 42 and a grip 43, to which turning moment is applied. The arm 42 is attached to a female connector 44 designed to receive a square shaped key (shown in phantom lines 54) of the same configuration as the head of the bit 38. A grub screw 45 is provided to releasably fasten the key 54 into the female connector 44. To use the handle 41, the key 54 is simply inserted into the rotary connector 33 and the handle 41 can then be turned to generate turning movement of the input gear 28, output gear 29 and rotary input 10, so as to manually extend and retract the column 8.

Figure 9:
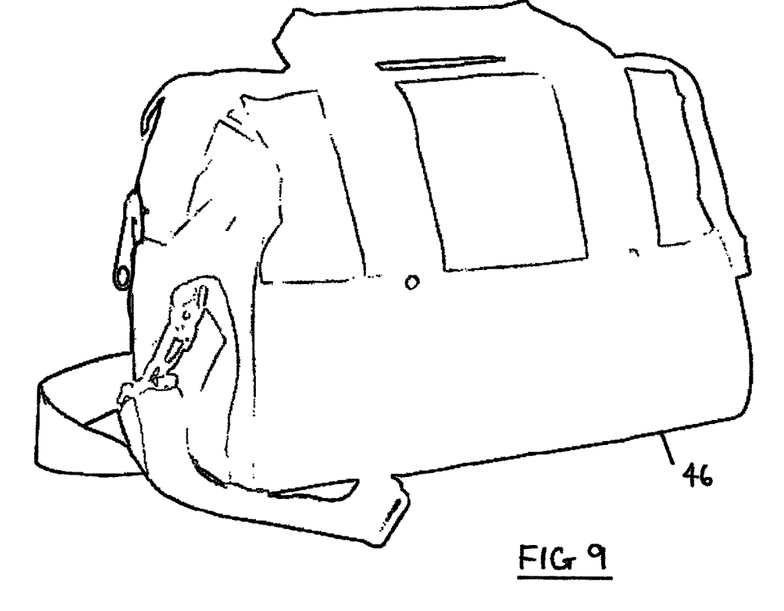
FIG. 9 is a perspective view of a kit bag.
Figure 10:
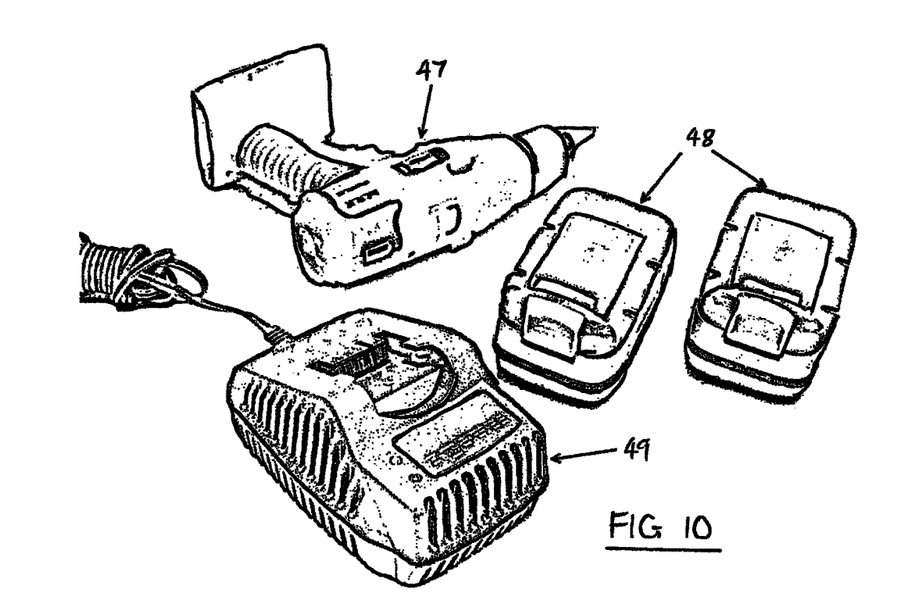
FIG. 10 is a perspective view of a power tool, charger and battery pack.

Referring now to FIGS. 9 and 10, the jack assembly 2, with the column 8, gear box 24, wheel 6 and base plate 22, bit 38 and handle 41 are preferably provided as a kit of parts in a kit bag 46, together a power tool 47, batteries 48 and a charger 49 so the entire invention is portable and designed to weigh only in the order of 15 kgs.

Figure 11:
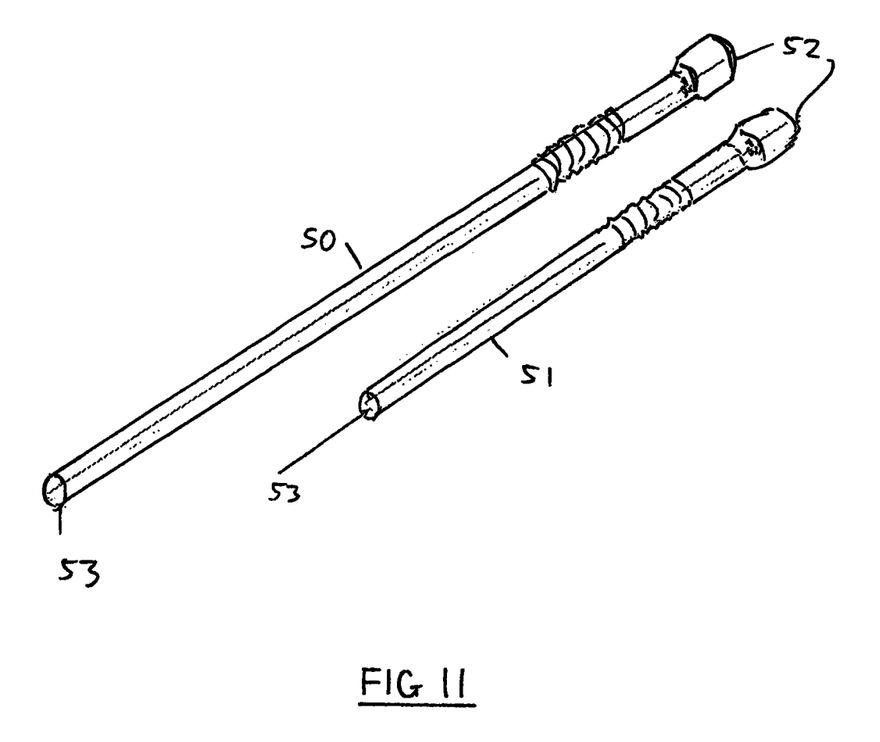
FIG. 11 is a perspective view of adaptors for leg stabilizing devices.

The kit of parts can also include adapters 50, 51 that have connecting sockets 52 to operate other equipment and devices of the vehicle. For example, the adapter 50 may be configured to fit with wheel nuts, while the adapter 51 may be designed as an extension piece to raise and lower a leg of a stabilizing device of a caravan. An end 53 of each adapter 50, 51 is preferably configured to be driven by the power tool 47 via the bit 38.

As may be appreciated from the above, the gear box 24 in combination with the power tool 47 eliminates users having to perform any physical winding or pumping motion and so minimizes the chance of injury/strain occurring when loading or unloading a drawbar of a caravan of the like from a towing vehicle.

As such, the invention is suitable for use for almost any age, gender or level of fitness.

The jockey wheel 1 is also designed to be easily substituted for a conventional jockey wheel and no modifications to an existing towed vehicle/caravan are required.

The ability to use a cordless power tool 47 is a unique aspect of the invention. The battery packs 48 and portable power tool 47 mean the invention can be used in remote locations where there is no mains power, although the charger 49 is provided so that the batteries 48, preferably re-chargeable lithium ion batteries, can be recharged when power is available.

The adapter 50 also allows for mechanical raising and lowering of stabilizing legs of caravans, which is a process previously requiring users to lower themselves to the ground and manually wind the legs up or down using a horizontal winding arm.

The invention can, in fact, allow for faster loading and unloading of a vehicle, such as a caravan, from a towing vehicle with minimal effort, reducing the total time by 50% to 80%, depending on whether stabilizing legs are used.

With regard to the particular application of the jack assembly 2 to a jockey wheel, the invention combines the features of a jockey wheel drive mechanism with the mechanical advantage of a gear box, to allow for power tool driven operation of the jockey wheel.

It is noted some complicated prior art jack assemblies available in general. However, those assemblies are configured as heavy duty permanent fixed landing gear on a truck, for example. Those assemblies are not used in relation to jockey wheels.

A traditional jockey wheel jockey wheel is not known to have a gear box transmission in addition to the built-in drive mechanism that is actuated by the rotary input, as described in the present embodiment.

In more general terms, a jockey wheel is a relatively light-weight mechanism that is attached to a draw bar, for manoeuvring trailers and caravans. In a preferred form, the jockey wheel is portable and demountable from the draw bar.

The jockey wheel is of great assistance in moving a caravan or trailer and is particularly useful in negotiating correct alignment and engagement of the draw bar with a tow ball of a vehicle.

To date, jockey wheels have used a manually operated drive mechanism (one example of which is a screw jack, which operates on a 1:1 ratio) to jack the jockey wheel up and down, as required. As mentioned in the Background of the Invention section of the specification, this manual operation can be difficult to achieve for some people such as the elderly.

The present invention delivers the mechanical advantage of a gear box to the jockey wheel. The gear box is fitted over the top of the jockey wheel column so that the rotary input of the drive mechanism connects with the input gear of the gear box. The input gear is especially adapted for being driven by a power tool, which makes the raising and lowering of the jockey wheel significantly easier and renders the entire process of operating and manoeuvring the jockey wheel easy enough for even the elderly to manage.

In view of the ease of operation, the benefit delivered by the present invention to the caravan industry alone is considerable. As indicated, such benefit derives from the jockey wheel being fitted with a gear box, for operating the drive mechanism of the jockey wheel.

The gear box housing does not significantly increase the jockey wheel mass, such that the jockey wheel 1 can replace any standard, conventional jockey wheel.

Figure 12:
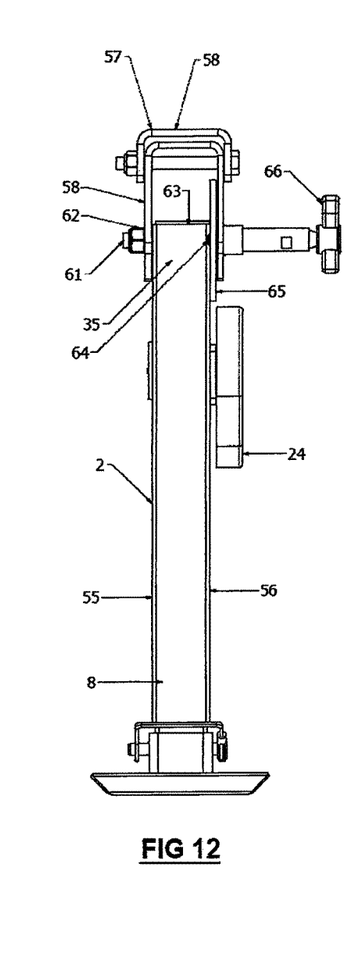
FIG. 12 is a side view of a lifting leg.

Turning now to FIG. 12, the jack assembly 2 is incorporated into a lifting leg 55 that can also be used as a stabilizing leg. For the purpose of the following description, like elements described above with reference to FIGS. 1 to 11 will be denoted with like reference numerals.

The lifting leg 55 if formed as a swing leg and includes a jack assembly 2 with a telescopic column 8. However, in this case, the gear box 24 is fitted to a front 56 of the leg 55, as opposed to the top end 35. The top end 35 of the assembly 2 is instead pivotally coupled to a swing bracket 57.

The bracket 57 includes nested first and second U-shaped components 58, 59. The first component 58 is for attaching to a trailer/caravan chassis or the like. The first component 58 is bolted to the second component 59. The second component 59 includes a bolt 61 that acts as a hinge pin 62 to connect to a pivot coupling 63 of the leg 55.

The leg 55 is secured against pivotal movement about the hinge pin 62 by a locking peg 64 that passes through a plate 65 attached to the leg 55. Another locking peg (not shown) is provided on the other side of the leg 55. A handle 66 is coupled to both pegs 64 and may be pulled in order to release the pegs 64 from the plate 65 to allow free rotation of the leg 55 relative to the bracket 57.

Figure 13:
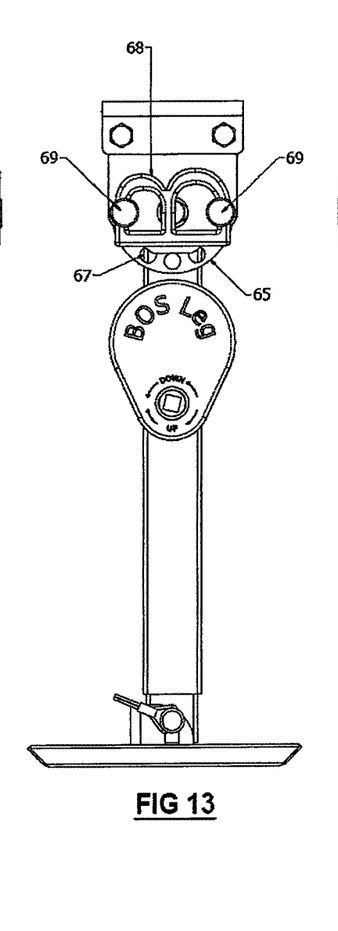
FIG. 13 is a front view of the lifting leg.

With reference to FIG. 13, the plate 65 is shown as being of circular form with through holes 67 that align with the pegs 64 at selected locking positions. The handle 66 includes a centre grip 68 and two side nodes 69 that are connected to the respective pegs 64.

Figures 14, 15:
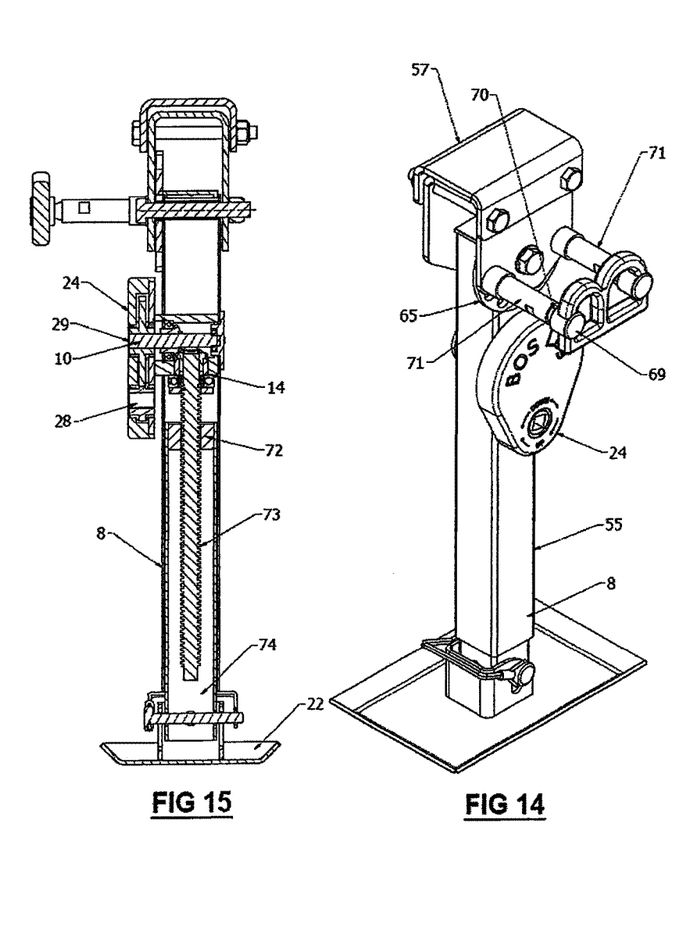
FIG. 14 is a perspective view of the lifting leg.
FIG. 15 is a cross-sectional view of the lifting leg.

Referring to FIG. 14, the side nodes 69 are connected to a respective shaft 70 that slides internally of an associated tube 71 mounted to the bracket 57. The handle 66 is preferably biased toward the bracket 57, into an engaged condition, where the pegs 64 pass through the plate 65 to lock the leg 55 in the downward position shown. The bias may, for example, be provided by way of springs (not shown) mounted internally of the tubes 71.

In that position, the telescopic column 8 may be extended or retracted, as required using the gear box 24.

Turning now to FIG. 15, the input gear 28 can be operated to drive the output gear 29 housed within the gear box 24. The output gear 29 is attached directly to the input 10 of the drive mechanism 14. The input and output gears 28, 29 are arranged to rotate about axes that are transverse to the column 8 and the drive mechanism 14 transfers that rotational movement in a transverse direction, down the column 8. In that regard, the drive mechanism 14 causes a carriage 72 inside the column 8 to advance or retract along an internal threaded rod 73, in order to move the connected inner support strut 74 and associated support plate 22, fixed to the lower end 4 of the column 8, up or down, as required. The support plate 22 could obviously be replaced with another suitable attachment such as a wheel or the like, as required.

Figure 16:
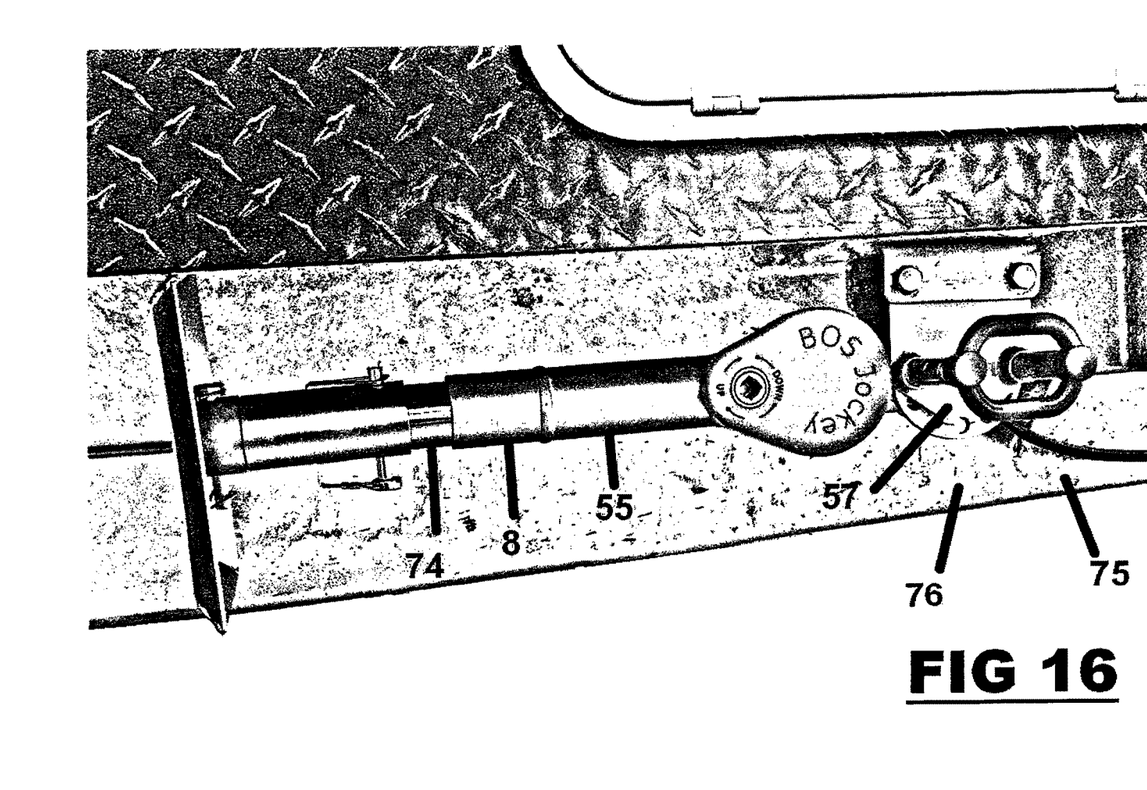
FIG. 16 is a view of the lifting leg in a stowed position.

With reference to FIG. 16, the bracket 57 is shown mounted to a chassis 75 of a caravan 76 and the leg 55 is shown pivoted and locked into a stowed position for transport. The leg 55 is also in a retracted condition where the support strut 74 has been moved inwardly of the column 8.

Figure 17:
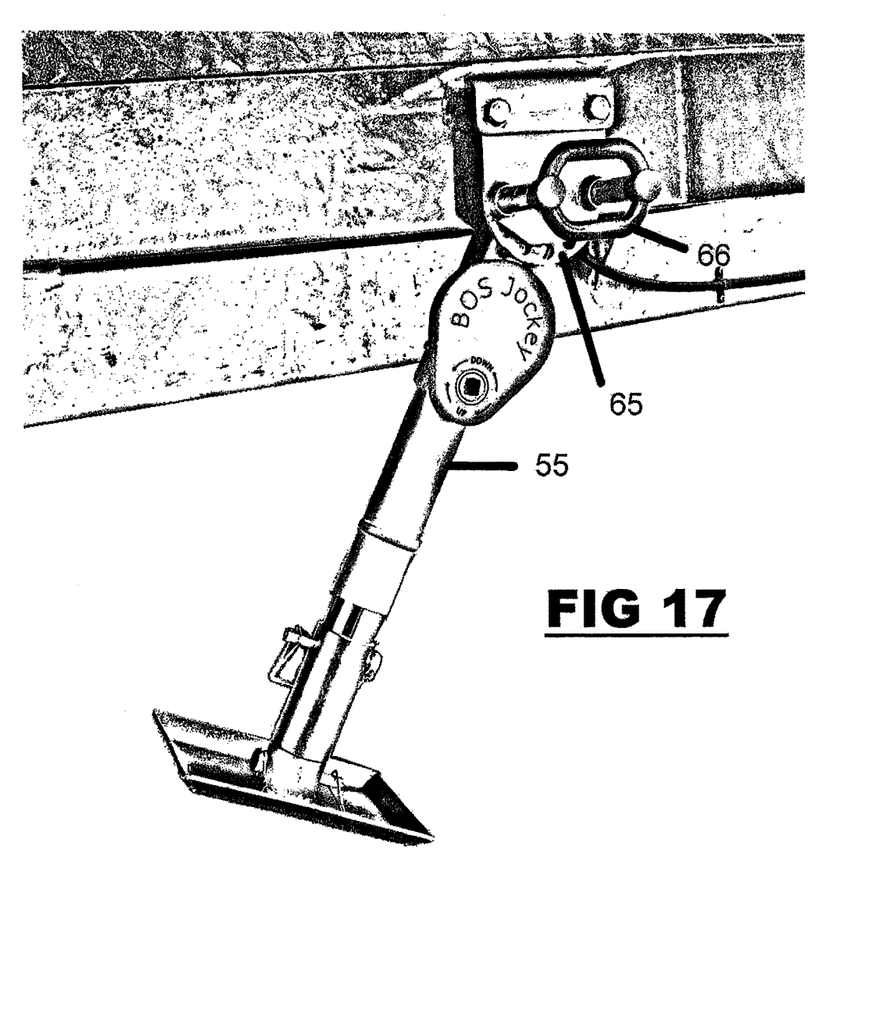
FIG. 17 is a view of the lifting leg in a partially deployed position.

In FIG. 17, the handle 66 has been pulled to release the locking plate 65 and allow the leg 55 to pivot into a partially deployed position.

Figure 18:
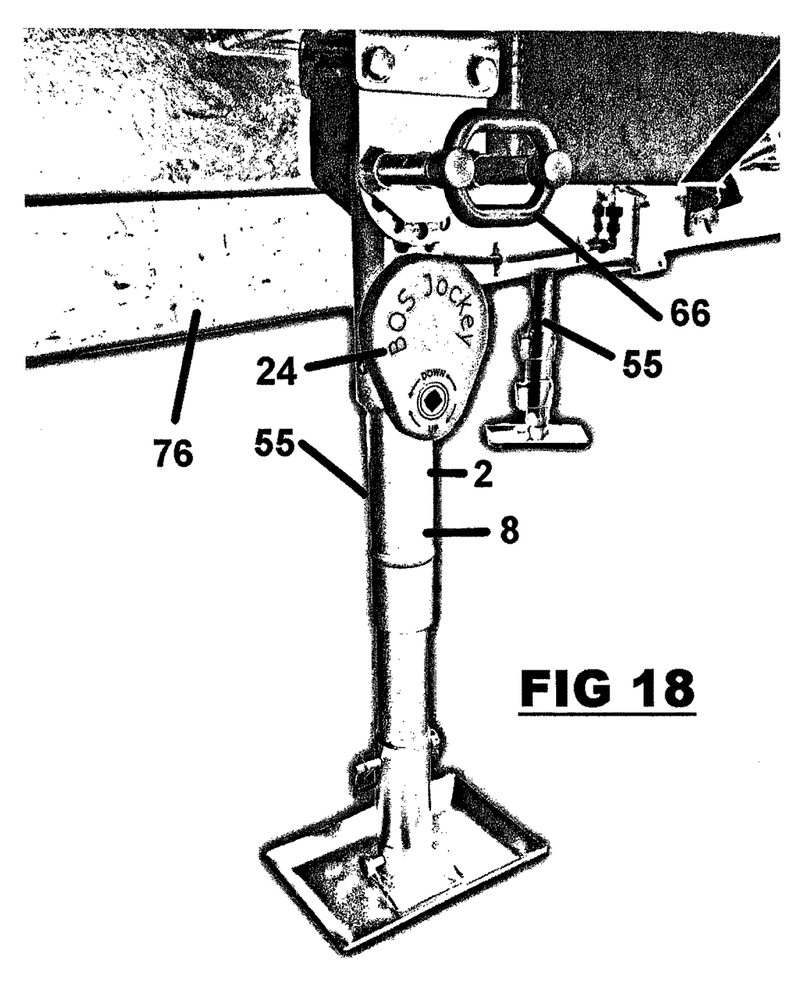
FIG. 18 is a view of the lifting leg in a deployed position.

In FIG. 18, the leg 55 is shown in a fully deployed position, where the handle 66 has been released into order to lock the plate 65 and leg 55 in the downward position. The gear box 24 has been used to extend the column 8 whereby the leg 55 acts to stabilise and lift the caravan 76, as required. A second support leg 55 is shown in the background of FIG. 18. A number of legs 55 are preferably arrayed about the caravan 76 to support each of the four corners of the caravan 76.

It should be appreciated the action of dropping the legs 55 into position and jacking up the caravan 76 using a power tool can be undertaken in a matter of minutes without any difficulty or physical demand. As such, even the elderly would be able to easily and quickly use the lifting leg 55 to secure a caravan at a camp site, using only a power tool.

One of the principle advantages of the invention is that is uses a simple and reliable mechanical jack assembly 2. The gear box 24 is incredibly simple and only has a single input gear 28 and a single output gear 29. The gearing ratio may be 2:1 but is preferably 2.5:1 and the lifting capacity of each leg is at least 600 kg. Using a conventional power tool such as a cordless drill, the input work/power ratio is 18V/45 NM.

With the above work to power ratio and the need for the leg 55 to not only stabilize considerable loads but also provide lift as well, there is a need to use bevel gears in the drive mechanism 14, which are ideally suited to transferring high loads in a transverse direction and particularly through 90 degrees.

Figure 19:
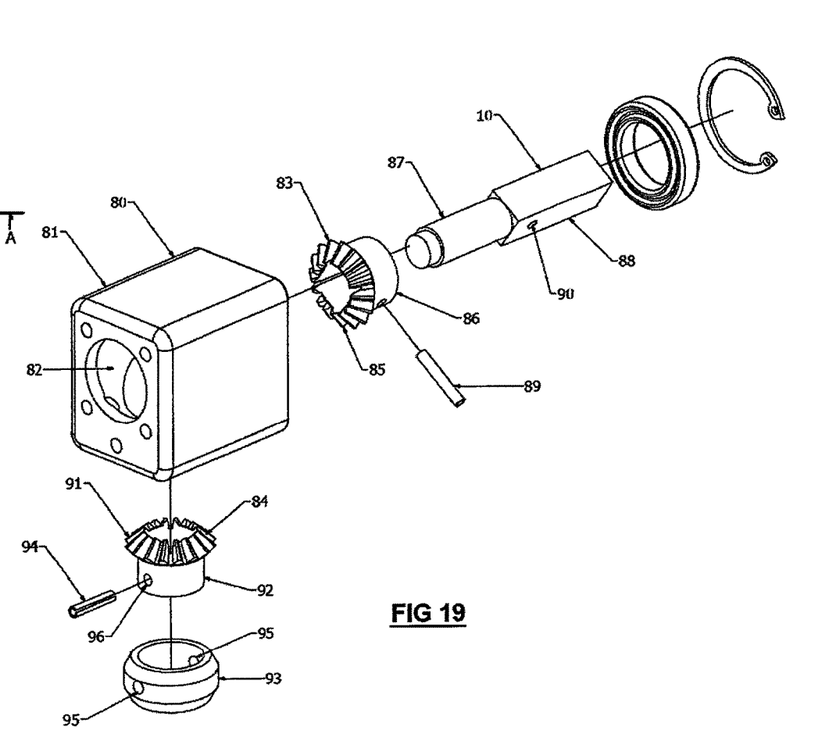
FIG. 19 is an exploded view of a gear module used in the lifting leg.

The bevel gears need to be very closely aligned for smooth and reliable operation and, for that purpose, the drive mechanism 14 includes a gear module 80, as illustrated in FIG. 19.

The module 80 is formed of a block 81 that includes an internally machined cavity 82 that houses a set of bevel gears 83, 84. A first gear 83 includes angled teeth 85 and a collar 86 that is fitted over a shaft 87 of the rotary input 10 and is secured onto a shank 88 of the input 10 via a fastener such as in the form of a spring pin 89 that locates in a hole 90 formed in the shank 88.

The second gear 84 includes angled teeth 91 to mesh with the teeth 85 of the first gear 83 and a cylindrical neck 92 that fits inside a bronze bush 93. Another fastener in the form of, for example, a spring pin 94 is arranged to locate in the gear 84 by passing through apertures 95 in the bush 93 and an associated hole 96 in the neck 92 of the gear 84.

Figure 20:
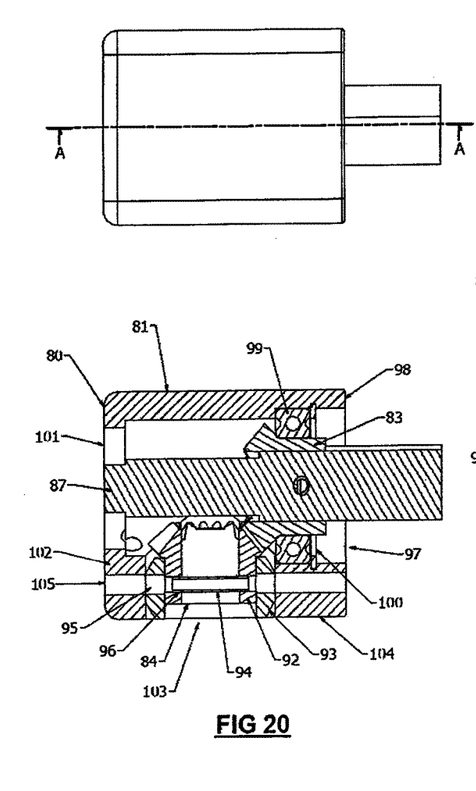
FIG. 20 is a cross-sectional view of the module.

Turning now to FIG. 20, the gears 83, 84 are shown positioned inside the block 81. The first gear 83 is supported in a first opening 97 in one end 98 of the block 81 by a bearing 99 that is accurately positioned on the collar 86 and locked in place with a retainer clip 100, to prevent the gear 83 pulling out of the block 81. In that position, the shaft 87 projects into a second opening 101 formed in the other end 102 of the block 81. The second gear 84 is located in an opening 103 formed in a base 104 of the block 81 so that the apertures 95 in the bush 93 and holes 96 in the neck 92 of the gear 84 align with a passage 105 formed in the block 81, in order to receive the pin 94.

In that configuration, the gears 83, 84 are in a pre-defined and pre-set configuration where the gears 83, 84 mesh accurately for smooth and reliable operation.

Figure 21:
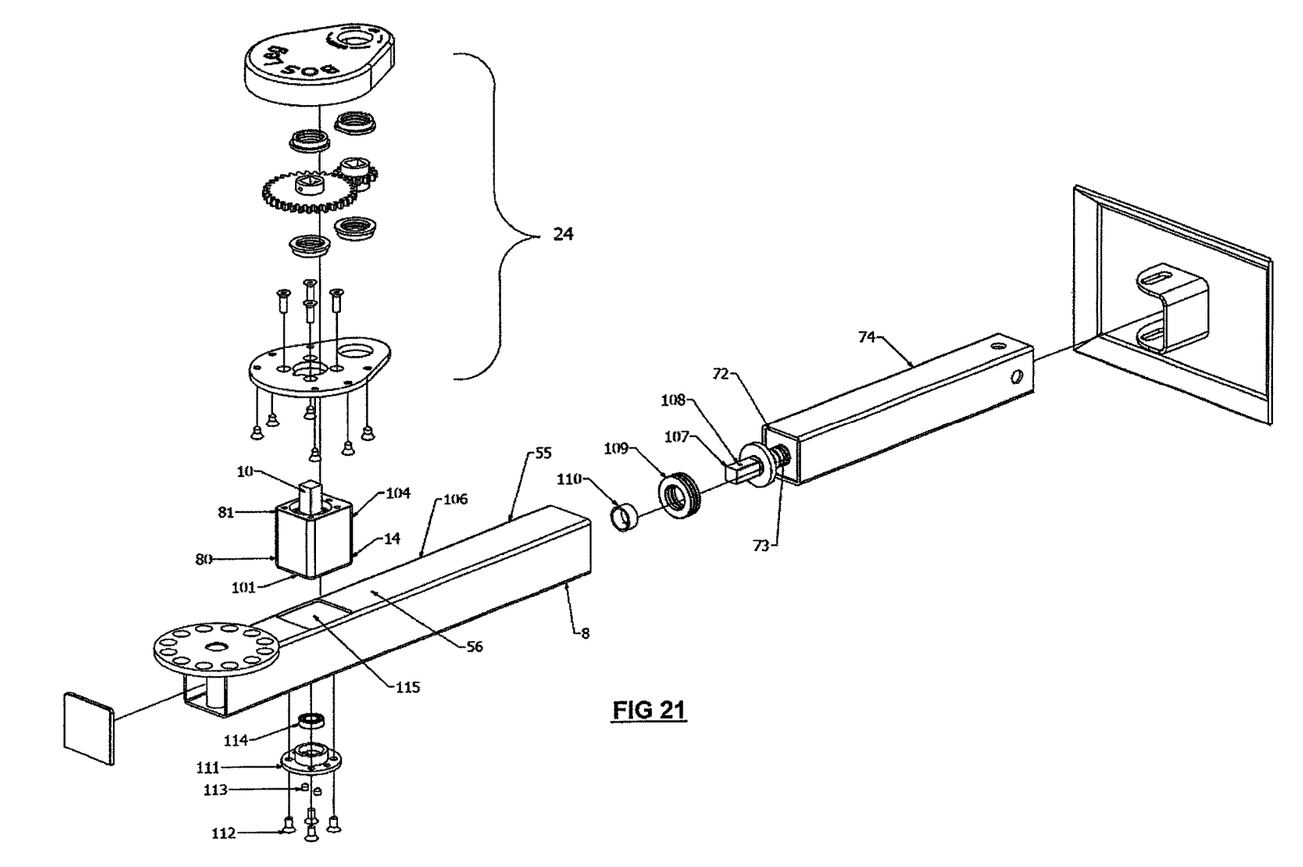
FIG. 21 is an exploded view of components of the lifting leg.

Referring now to FIG. 21, the construction of the leg 55 is illustrated in more detail. The column 8 of the leg 55 is formed of the inner strut 74 and an outer sleeve 106. The inner strut 74 is fixed to the carriage 72 that is screw threaded onto the threaded rod 73.

The threaded rod 73 has a square shaped head 107 with a through bore 108. The head 107 passes through a bearing 109 and a spacer 110 and connects into the base 104 of the block 81, internally of the neck 92. The pin 94 described with reference to FIG. 20 is then slotted through the passage 105 and into the through bore 108 in order to lock the head 107 to the second gear 84.

The module 80 has a backing plate 111 that is fixed over the opening 101 in the block 81 and is secured in place with fasteners 112 and grub screws 113. The backing plate 111 carries a bearing 114 to support the remote end of the shaft 87 of the rotary input 10.

The sleeve 106 has a hole 115 cut in the front 56 to receive the block 81 so that the module 80 can simply be dropped in place and secured, for receipt of the head 107 of the threaded rod 73 through the base 104 of the block 81 and for connection of the gear box 24 to the rotary input 10.

It may be appreciated from the above that the gear module 80 and the gear box 24 can thereby be manufactured as modular components that are simply connected together to form a working drive mechanism 14 for a lifting leg 55 that has considerable lifting capacity and can be quickly and easily operated using only a conventional power drill.

It should be appreciated the present invention has been described with particular reference to a caravan but also has application to other jack equipment or devices where rotary mechanical input is required such as with standard vehicle jacks or the like.

The reference in this specification to any prior publication (or information derived from it), or to any matter which is known, is not, and should not be taken as, an acknowledgement or admission or any form of suggestion that that prior publication (or information derived from it) or known matter forms part of the common general knowledge in the field of endeavour to which this specification relates.

LIST OF PARTS

1. Jockey wheel
2. Jack assembly
3. Coupling
4. Lower end
5. Mount
6. Wheel
7. Release pin
8. Column
9. Ribs
10. Rotary input
11. Upper end
12. Square thread
13. Locking pin
14. Drive mechanism
15. Drawbar
16. Clamp
17. Lever
18. Security nut
19. Brace
20. Head
21. Shank
22. Support plate
23. Collar
24. Gear box
25. Casing
26. Top plate
27. Bottom plate
28. Input gear
29. Output gear
30. Bushes
31. Socket
32. Bushes
33. Connector
34. Socket
35. Top end
36. Housing
37. Opening
38. Bit
39. Head
40. Tail
41. Handle
42. Lever arm
43. Grip
44. Female connector
45. Grub screw
46. Kit bag
47. Power tool
48. Batteries
49. Charger
50. Adapter
51. Adapter
52. Sockets
53. End
54. Key
55. Leg
56. Front
57. Swing bracket
58. Component
59. Component
60. Chassis
61. Bolt
62. Hinge pin
63. Pivot coupling
64. Peg
65. Plate
66. Handle
67. Holes
68. Grip
69. Nodes
70. Shaft
71. Tube
72. Carriage
73. Threaded rod
74. Strut
75. Chassis
76. Caravan
80. Gear Module
81. Block
82. Cavity
83. First bevel gear
84. Second bevel gear
85. Teeth
86. Collar
87. Shaft
88. Shank
89. Pin
90. Hole
91. Teeth
92. Neck
93. Bush
94. Pin
95. Apertures
96. Hole
97. First opening
98. End
99. Bearing
100. Clip
101. Second opening
102. End
103. Opening
104. Base
105. Passage
106. Sleeve
107. Head
108. Bore
109. Bearing
110. Spacer
111. Backing plate
112. Fasteners
113. Screws
114. Bearing
115. Hole

The invention claimed is:

1. A jockey wheel including a telescopic column for attachment to a towed vehicle, to raise and lower a draw bar of the vehicle, wherein the column includes: a drive mechanism with a rotary input that rotates to cause the column to extend or retract; and a gear box with a rotary connector adapted to connect to and be driven by a power tool, wherein the gear box comprises an output gear having a socket that drives the rotary input so as to provide for geared operation of the drive mechanism, wherein the gear box is mounted over a top end of the column such that the socket of the output gear fits over and engages the rotary input, wherein the output gear and the rotary input have a common rotational axis, and wherein the rotary connector has a rotational axis that is parallel to the common rotational axis.

2. The jockey wheel of claim 1, wherein the rotary input is located at one end of the column and the gear box includes a housing that sits over the one end of the column such that the rotary input connects with the output gear of the gear box.

3. The jockey wheel of claim 2, wherein the jockey wheel fitted with the gear box is portable and demountable from the draw bar.

4. The jockey wheel of claim 2, wherein the gear box further includes an input gear coupled to the rotary connector.

5. The jockey wheel of claim 2, wherein the rotary input has a square thread for receipt in a corresponding socket of the output gear and the input gear includes a square shaped socket for receipt of a bit of the power tool.

6. The jockey wheel of claim 2, wherein the rotary input includes a pin to lock the output gear onto the rotary input.

7. The jockey wheel of claim 1, further including a coupling at a lower end of the column for connection with a mount of a wheel.

8. The jockey wheel of claim 7, wherein the coupling includes a release pin to rotatably hold the mount to the column.

9. The jockey wheel of claim 1, wherein the column has a series of ribs at spaced locations along an extent of the column, to engage in a clamp for securing the jockey wheel to the draw bar of the vehicle.

10. The jockey wheel of claim 9, wherein the column has at least three ribs.

11. A kit of parts, including a jockey wheel, as claimed in claim 1 and a bit for a power tool to couple with the rotary input.

12. The kit of claim 11, further including a stabilizing plate fitted with a mount which can be connected in place of a wheel of the jockey wheel.

13. The kit of claim 11, further including a handle for manual operation of the drive mechanism.

14. The kit of claim 13, wherein the handle is adapted to connect to the rotary connector of the gear box.

15. The kit of claim 13, further including an adapter to connect the bit to a rotary drive of another device of a vehicle.

16. The kit of claim 11, further including a power tool and battery pack that are configured to rotate the bit for the power tool.

17. A vehicle to be towed including the jockey wheel of claim 1, fitted to a drawbar of the vehicle.

* * * * *